United States Patent Office 2,735,759
Patented Feb. 21, 1956

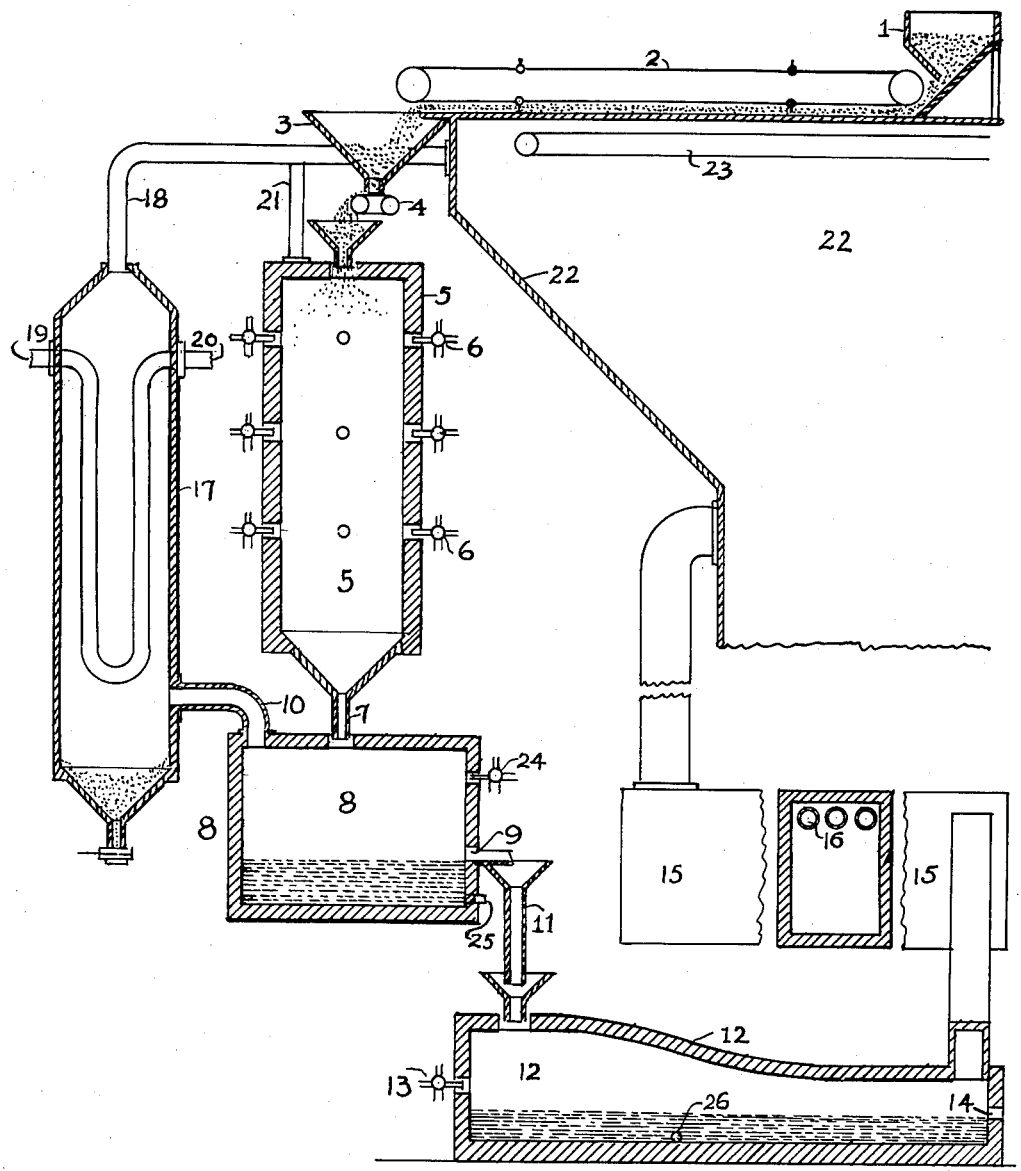

2,735,759
PROCESS OF SMELTING COPPER SULFIDE ORES

William E. Greenawalt, Denver, Colo.

Application February 8, 1951, Serial No. 210,070

4 Claims. (Cl. 75—74)

This invention relates in general to ore smelting processes. It is directed, and will more particularly be described, to the smelting of finely divided copper ore, such as flotation concentrate, which may have associated with it other metals, such as gold and silver, or lead and zinc. The present almost universal method of smelting copper concentrate, obtained from low grade disseminated deposits by flotation, is to charge it cold and wet into a reverberatory smelting furnace to smelt it to produce copper matte and slag. This is an elaborate and expensive process, because it heats the ore in mass from the top down, limits the capacity of the smelting furnace, produces enormous volumes of excess waste gas, promotes the corrosive action of the refractories, and greatly increases the fuel required for effective smelting. The object of my process is to overcome these difficulties, and facilitate and cheapen the smelting of such ores.

The process will be described in connection with the accompanying drawing, which represents a vertical flow diagram of the invention. 1 is a bin to receive the finely divided ore concentrate as delivered from the mill. 2 is a drier over the dust chamber 22, heated by means of the hot waste gas from the smelting operation. The fine ore is fed at a determined rate in a continuous stream to the drier, and advanced while drying toward its discharge end, and delivered into the hopper 3, from which it is fed in a continuous stream to the melting chamber 5, by means of the feeder 4. It is then showered through the highly heated atmosphere of the melting chamber, which is eated by means of fuel burners 6 to a temperature sufficiently high to liquefy the fine ore passing through it. The molten ore and the waste melting chamber gas flow through the bottom opening 7 into an enclosed container 8 containing a pool of the molten ore. The molten ore overflows from the pool, preferably in a continuous stream, through the overflow outlet 9. The hot molten ore is delivered into a reverberatory smelting furnace 12, preferably in a continuous stream, by means of the conduit 11, where the operation is completed to effectively separate the copper matte from the worthless slag. The temperature of the molten charge in the pool may be maintained or increased as desired by means of the fuel burner 24. The temperature of the molten charge in the smelting furnace 12 is maintained or increased as desired by means of the fuel burner 13.

The efficiency of the separation of slag and matte in the smelting furnace is largely determined by the temperature of the charge. A high temperature will give a cleaner separation than a low temperature, and in view of the fact that the ore is charged into the smelting furnace in a molten condition, freed from extraneous gas and dust, and practically free from dust in smelting the molten charge, the molten charge in the smelting furnace may be maintained at a high temperature without serious injury to the smelting furnace and at the lowest practical cost of heating fuel. The slag overflows, preferably in a continuous stream, through the outlet 14, or it may be tapped intermittently. The smelting furnace waste gas flows through the flue 15 into the dust chamber 22. Pipes for heating air, 16, are inserted in the flue 15; and pipes 23 for preheating air are inserted in the dust chamber 22.

The hot gas over the pool of molten ore in the enclosed container 8 is exhausted through the flue 10 and delivered into the heat exchanger 17, which also serves as a dust settler; from there it is flowed into the dust chamber 22. Fresh air is introduced into the heat exchanger through the pipe 19, and the hot air flows out through the pipe 20, and is delivered to the fuel burners 6 and 13, and also to supply hot air direct to the melting chamber and the smelting furnace. The dust which settles out of the gas in the heat exchanger 17 may be removed from time to time through the opening 21 at the bottom. Provision is made to exhaust gas from the top of the melting chamber 8. It is conducted into the dust chamber 22 through the flues 23 and 18.

It is desirable to heat the fresh air to as high a temperature as practical, both for the burners and for the chemical reactions in the melting chamber and the smelting furnace. This reduces the volume of air used in the process, reduces the amount of dust, cheapens heating and smelting, and greatly increases the amount of ore treated, as compared with processes now in general use in which the ore is charged wet or cold direct into the smelting furnace.

The atmosphere at the top of the melting chamber should be as high as practical to bring the suspended particles instantly to the flashing and melting temperature, and to give the coarser particles ample time to become molten in their descent through the melting chamber. Small particles of sulphide ore, such as those obtained through flotation, can be almost completely oxidized in a few seconds when showered through a highly heated oxidizing atmosphere. The fine molten particles, under continuous motion, will tend to coalesce and thus reduce the amount of dust produced as compared with the same unfused particle, and fused particles, of themselves, will produce less dust than the same unfused particles. Much of the molten ore will impinge against the side walls of the melting chamber and descend in fluid form in contact with the side walls. Corrosion of the refractories will be no greater, probably much less, than in a reverberatory furnace operated in the regular way, with dust and steam laden gas always impinging against the highly heated reverberatory arch. Corrosion may also be minimized in the melting chamber through water jackets or other cooling device along the outside walls, which is quite impractical in reverberatory arches. Furthermore, the refractory lining of the melting chamber can be quickly and easily replaced without seriously interfering with the operation of the process as a whole. This is particularly true if there are two or more melting chambers connected up with one smelting furnace; and this becomes practical, because the smelting furnace will have from three to four times the capacity of the same furnace if the ore is charged wet and cold in the usual way, direct into the smelting furnace.

The pool of molten ore may be large or small, deep or shallow. The object of the pool container, in addition to regulating the flow of molten ore, is to separate the melting chamber gas from the molten ore, in order to flow the molten ore into the smelting furnace freed from melting chamber gas.

The dried ore should be delivered into the melting chamber as hot as practical, usually somewhat below 300 deg. F., at about which point sulphur begins to volatilize.

A tap 25 is provided at the bottom of the pool container to empty it or to separately drain off its lower contents.

Reacting agents, such as finely ground coal or limestone, may be added to the ore stream anywhere in the circuit, preferably at the drier.

The copper concentrate derived from disseminated ore deposits, is largely in the form of chalcocite, and the concentrate is so high in copper as to make excessive elimination of sulphur unnecessary or undesirable to get the desired quality of matte for converting. In which case the atmosphere in the melting chamber and in the smelting furnace will be neutral or only slightly oxidizing. If, on the other hand, the ore is high in sulphur and low in copper, the atmosphere should be highly oxidizing, and most of the sulphur will be eliminated as flash oxidation in the process of melting, and will act as fuel to help liquefy the ore.

Should the ore contain lead or zinc, powdered coal may be introduced with the ore, or otherwise, into the melting chamber or smelting furnace to volatilize them and recover the volatilized metals from the resulting fume.

The matte, or other metallic products of the smelting operation, may be flowed out of the smelting furnace through the tap-hole 26.

By charging the ore in a molten state into the smelting furnace, the charging may be made automatically and continuous, as compared with present practice. Practically the entire cost of charging, both of installation and operation, may be eliminated by my process.

I claim:

1. A process of smelting finely divided copper sulphide ore comprising, showering the ore through the highly heated atmosphere of a melting chamber to melt it, withdrawing the resulting molten copper product, the ore slag, and the melting chamber gas in a combined continuous stream from the melting chamber, separating the molten copper product and the ore slag from the melting chamber gas, then flowing the mixture of molten copper product and ore slag, separated from the melting chamber gas, into a reverberatory smelting furnace to complete the smelting and separate the molten copper matte from the molten ore slag, and separately withdrawing the molten copper matte and the molten ore slag from the smelting furnace.

2. A process of smelting finely divided ore containing copper sulphides comprising, showering the ore through the highly heated atmosphere of a melting chamber to melt it, passing the mixture of the molten ore and the resulting melting chamber gas into an enclosed container containing a pool of the molten ore, withdrawing the hot waste melting chamber gas from over the pool of the molten ore, then flowing the molten ore, consisting of a mixture of copper matte and ore slag, freed from the melting chamber gas, into a smelting furnace to complete the conversion of the molten ore into copper matte and slag, and separating the molten matte from the molten slag.

3. A process of smelting finely divided ore containing copper sulphides comprising, showering the ore through the highly heated atmosphere of a melting chamber to melt it, withdrawing the mixture of molten ore and melting chamber gas from the melting chamber, separating the molten ore from the resulting melting chamber gas, then flowing the molten ore consisting of a mixture of copper matte and ore slag, freed from the melting chamber gas, into a smelting furnace to complete the conversion of the molten ore into copper matte and ore slag, and separating the molten charge into layers of copper matte and ore slag.

4. A process of smelting finely divided ore containing copper sulphides comprising, showering the ore through the highly heated atmosphere of a plurality of melting chamber units to melt it, withdrawing the mixture of molten ore and melting chamber gas from the respective melting chamber units, separating the molten ore from the resulting melting chamber gas in each of the separate melting chamber units, then flowing the molten ore of the separate melting units consisting of a mixture of copper matte and ore slag, freed from the melting chamber gas, into a common smelting furnace to complete the conversion of the molten ore into copper matte and ore slag, and separating the copper matte from the ore slag.

References Cited in the file of this patent

UNITED STATES PATENTS

| | | |
|---|---|---|
| 559,253 | Bertrand et al. | Apr. 28, 1896 |
| 1,888,164 | Freeman | Nov. 15, 1932 |
| 2,234,473 | Greenawalt | Mar. 11, 1941 |
| 2,506,557 | Bryk et al. | May 2, 1950 |